United States Patent
Thorne

(10) Patent No.: US 9,274,249 B2
(45) Date of Patent: Mar. 1, 2016

(54) SYSTEM AND METHOD FOR FACIES CLASSIFICATION

(75) Inventor: Julian Thorne, Orange, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 940 days.

(21) Appl. No.: 13/488,876

(22) Filed: Jun. 5, 2012

(65) Prior Publication Data

US 2013/0325350 A1    Dec. 5, 2013

(51) Int. Cl.
*G01V 11/00* (2006.01)
*G01V 1/40* (2006.01)

(52) U.S. Cl.
CPC . *G01V 11/00* (2013.01); *G01V 1/40* (2013.01); *G01V 2210/66* (2013.01)

(58) Field of Classification Search
CPC ........... G01V 1/32; G01V 1/325; G01V 1/28; G01V 1/48
See application file for complete search history.

(56) References Cited

U.S. PATENT DOCUMENTS

| | | | |
|---|---|---|---|
| 4,646,240 A | 2/1987 | Serra et al. | |
| 7,620,498 B2 | 11/2009 | Kowalik et al. | |
| 2002/0042677 A1* | 4/2002 | West et al. | 702/14 |
| 2002/0183932 A1 | 12/2002 | West et al. | |
| 2006/0041409 A1* | 2/2006 | Strebelle et al. | 703/10 |
| 2006/0074825 A1 | 4/2006 | Mirowski | |
| 2009/0276157 A1 | 11/2009 | Wilkinson et al. | |

OTHER PUBLICATIONS

Grana, Dario, et al.; "Quantitative Log Interpretation and Uncertainty Propagation of Petrophysical Properties and Facies Classification from Rock-Physics Modeling and Formation Evaluation Analysis"; Geophysics, vol. 77, No. 3, May-Jun. 2012, pp. WA45-WA63; XP-001575529.

Grana, Dario, et al.; "Stochastic Inversion of Facies from Seismic Data Based on Sequential Simulations and Probability Perturbation Method"; Geophysics, vol. 77, No. 4, Jul.-Aug. 2012, pp. M53-M72; XP-001576779.

* cited by examiner

*Primary Examiner* — Mischita Henson

(57) ABSTRACT

A method of automatically interpreting well log data indicative of physical attributes of a portion of a subterranean formation which include some portion of samples with known facies classification to be used as training data, dividing the training data into two subsets, a calibration set and a cross-validation set, using an automated supervised learning facies identification method to determine a preliminary identification of facies in the subterranean formation based on the calibration set, calculating a confusion matrix for the supervised learning facies identification method by comparing predicted and observed facies for the cross-validation set, calculating a facies transition matrix characterizing changes between contiguous facies, and using the preliminary identification, the facies transition matrix, and the confusion matrix, iteratively calculating updated facies identifications.

10 Claims, 2 Drawing Sheets

SYSTEM AND METHOD FOR FACIES CLASSIFICATION

BACKGROUND

1. Field

The present invention relates generally to facies classification and more particularly to facies classification based on pattern recognition.

2. Background

Borehole log data is collected via a number of techniques including resistivity/conductivity measurements, ultrasound, NMR, and radiation scattering, for example. Conventionally, borehole data is analyzed by human interpreters in order to characterize a subsurface geological formation to allow decisions to be made regarding the potential of a well or to determine information about the nature of the surrounding geologic area.

Systems have been proposed for automated interpretation of log data including supervised machine learning processes based on pre-classified training sets. These systems generally employ back-propagation neural nets and decision tree methods. An example of a rule-based machine learning classification approach is described in U.S. Pat. No. 7,620,498 to Kowalik.

SUMMARY

An aspect of an embodiment of the present invention includes a method of automatically interpreting well log data indicative of physical attributes of a portion of a subterranean formation including obtaining training data comprising well logs including facies classification information for the well logs, dividing the training data into two subsets, a calibration set and a cross-validation set, using an automated supervised learning facies identification method to determine a preliminary identification of facies in the subterranean formation based on the calibration set, calculating a confusion matrix for the supervised learning facies identification method by comparing predicted and observed facies for the cross-validation set, calculating a facies transition matrix characterizing changes between contiguous facies, and using the preliminary identification, the facies transition matrix, and the confusion matrix, iteratively calculating updated facies identifications.

An aspect of an embodiment of the present invention includes a system including a data storage device and a processor, the processor being configured to perform the foregoing method.

Aspects of embodiments of the present invention include computer readable media encoded with computer executable instructions for performing the foregoing method and/or for controlling the foregoing system.

DESCRIPTION OF THE DRAWINGS

Other features described herein will be more readily apparent to those skilled in the art when reading the following detailed description in connection with the accompanying drawings, wherein.

DETAILED DESCRIPTION

In accordance with an embodiment of the present invention, a method for classifying facies in a borehole log makes use of information relating to patterns in successive facies samples. In this approach, a facies transition matrix (a quantitative representation of facies pattern) is used to modify predicted facies classifications in any supervised learning facies classification method. A confusion matrix is defined to characterize uncertainty in predicted classifications, and is used to predict a probability for each facies at each sample depth.

A set of well log data is obtained, and classifications are assigned on a plurality of well log samples, for example by use of core descriptions. As will be appreciated, the classifications may have been pre-assigned or may be assigned by expert analysis as part of the implementation of the present method. These assignments are considered to be known facies. A portion of the well log data with known facies is selected and removed and set aside prior to further processing. That is, the data with known facies is divided into training and testing sub-sets, where the testing sub-set may be referred to as "left-out" or "cross-validation" data. The left-out data may be selected randomly and a percentage of the data to be left out may be set as a parameter by a user or may be a constant percentage. When there are many data samples, the percentage of data to be left out can approach 50%.

The method proceeds with implementation of any conventional computer implemented supervised pattern recognition or machine learning method for identifying facies and trained using the training set. As will be appreciated, there are a variety of such methods including back-propagation, neural net, decision tree, and any number of additional supervised learning algorithms that can be applied to well log data.

Once the machine learning method has been trained, it used to predict facies on all the samples which includes the left out data, and a confusion matrix $C_{ij}$ is generated by comparing the output of the trained machine learning algorithm against the previously assigned classifications for those portions of the data.

A facies transition matrix is generated, which characterizes the changes between previously assigned facies in the well log data. A preliminary predicted facies transition matrix is generated, which characterizes the changes between facies in the preliminary predicted classification.

Figure 1:
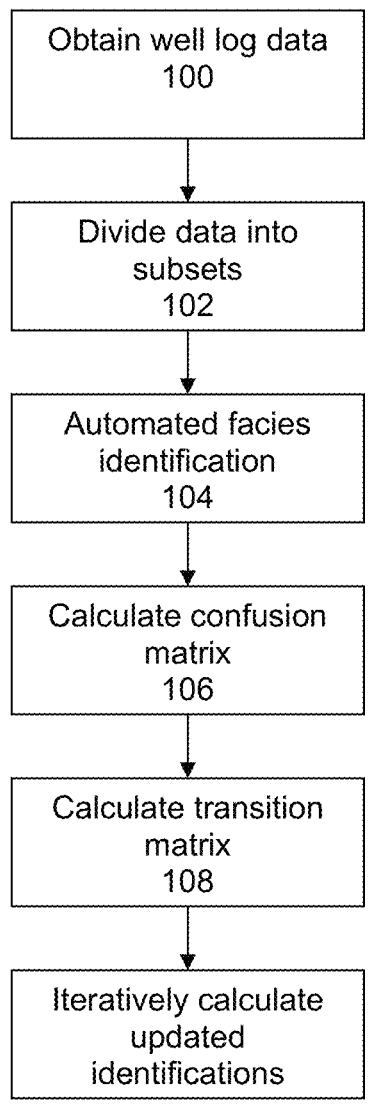
FIG. 1 is a flowchart illustrating a process in accordance with an embodiment of the invention.
Figure 2:
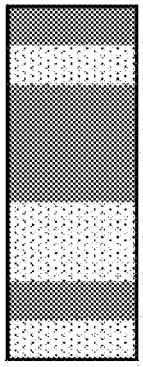
FIG. 2 illustrates the calculation of a transition probability matrix from a column of sand and shale.

A transition matrix describes each pair of contiguous facies and their relation to each other. For example, where a contiguous pair shows a change from shale to sandstone, the transition matrix would capture that relationship as well as a change from sandstone back to shale, as shown in FIG. 2.

Once the observed and preliminary predicted transition matrices are calculated, a target probability matrix may be developed. In this regard, it is possible to calculate target probabilities based on a prediction, or it is possible to set the transition probability matrix strictly based on the observed transitions. Stated more generally, a predicted matrix $P_{ij}$ and an observed matrix $O_{ij}$ describing a particular depth interval may be combined to give the target transition matrix $T_{ij}$ which is given as:

$$T_{ij} = P_{ij}^{(1-w)} O_{ij}^{w} \tag{1}$$

in which:

$$w = |(P_{ij} - O_{ij})/(P_{ij} + O_{ij})|^{\alpha} \tag{2}$$

and $\alpha$ is a user supplied parameter that adjusts the influence of a constraint on the transition matrix. As $\alpha$ is increased, the constraint increases in influence. In the limiting case where α=0, w=1 and the P matrix has no influence. For large α, w approaches 0 and the O matrix has no influence. The form of equations 1 and 2 imply that predicted transition frequencies that are close to the observed frequencies are adjusted only a small relative amount compared to predicted transition frequencies that are far from observed frequencies. Thus, the transition probability matrix will be derived directly from the observed transition probabilities.

Once the target matrix is generated, it may be normalized, so that a sum for each i over its respective transition types j equals one (i.e., for each i, having $n_i$ different types of transitions, $$\sum_{j=1}^{n_i} T_{ij} = 1).$$

Once the normalized transition matrix is complete, a random path is used to visit a plurality of sample nodes $F_n$. As will be appreciated, the random path may be constrained such that no node is visited twice and such that all nodes are visited once.

As a first sub-step, for facies to same facies transitions, i.e., $T_{ij}$, at which $P_{ij} < T_{ij}$, the node is potentially changed to match the target. That is, where the prediction has a lower value than the transition matrix, the prediction is pushed towards the transition matrix as the more likely proper classification. In this regard, the confusion matrix probability $C_{ij}$ is used as the probability of changing $F_n$ from facies i to facies j. It should be noted that the constraint that $P_{ij} < T_{ij}$ has the result that a node is not changed where the change would tend to adversely affect convergence to target transition frequencies.

The result should be that the values converge such that same to same transitions from the updated $F_n$ reach the target $T_{ij}$. Once this convergence is reached, a new $P_{ij}$ may be calculated from the updated classifications.

Next, using the new $P_{ij}$, the same method is applied to the heterogeneous transitions (i.e., transitions in which i≠j). Again, for facies to different facies transitions at which $P_{ij} < T_{ij}$, the node is changed in accordance with the confusion matrix and by following a random path or a random path with constraint to ensure all nodes are visited.

Completion of the convergence for the heterogeneous transitions results in a predicted facies sequence that may be considered to be a single realization of the facies model. After completion of the facies model realization, a new seed may be chosen for a random walk and the method applied to the original $F_n$ to produce another realization. A plurality of realizations are produced in this fashion, and a probability for each facies is calculated from the ensemble of realizations. As is well known in statistics the uncertainty of estimating the mean value from a set of realizations decreases with the square root of the number of realizations. The resulting probability logs may be used to generate reservoir and/or facies probability volumes and maps for a reservoir earth model, which may in turn be used as a basis for exploration and/or production decisions for the formation.

Figure 3:
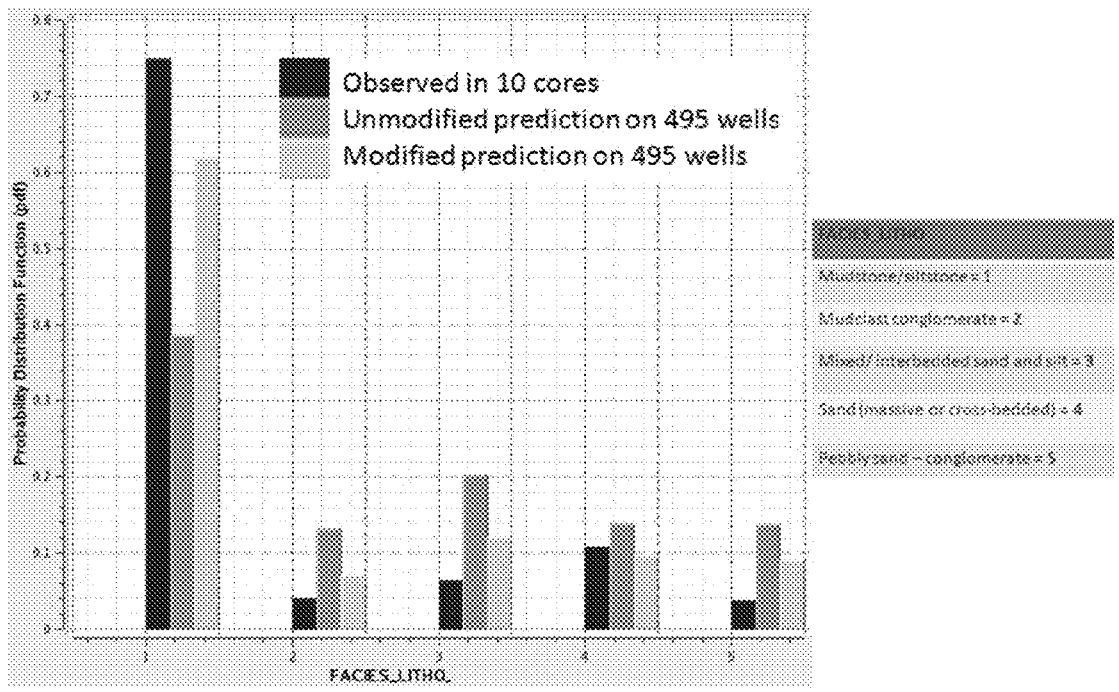
FIG. 3 is a bar graph illustrating predicted, observed and modified predicted probability distribution functions for selected facies classifications.

FIG. 3 illustrates results of the application of a method in accordance with an embodiment of the present invention. In the figure, the frequency (probability distribution function) of the original supervised facies prediction on 495 wells is shown to be very different then the frequencies of the five facies as interpreted in ten cores. The predicted facies are modified using the observed frequencies (as well as transition frequencies between different facies not shown here). By application of Equations (1) and (2), the observed frequencies act as a soft constraint (i.e., they influence, without forcing a specific outcome) such that the final modified frequencies are a compromise between the original predictions and the observed data. In the illustrated example, the core data is only available in ten wells. As will be appreciated, the number of wells available for use in compiling observed frequency data may influence the selection of an appropriate α for use in Equation (2), above, which has limited the influence of the observed facies frequencies on the modified resulting frequencies.

As will be appreciated, the method as described herein may be performed using a computing system having machine executable instructions stored on a tangible medium and a processor configured and arranged to execute the machine executable instructions. The instructions are executable to perform each portion of the method, either autonomously, or with the assistance of input from an operator. In an embodiment, the system includes structures configured and arranged to allow input and output of data, and a display that is configured and arranged to display the intermediate and/or final products of the process steps. A method in accordance with an embodiment may include an automated selection of a location for exploitation and/or exploratory drilling for hydrocarbon resources. Where the term processor is used, it should be understood to be applicable to multi-processor systems and/or distributed computing systems.

Those skilled in the art will appreciate that the disclosed embodiments described herein are by way of example only, and that numerous variations will exist. The invention is limited only by the claims, which encompass the embodiments described herein as well as variants apparent to those skilled in the art. In addition, it should be appreciated that structural features or method steps shown or described in any one embodiment herein can be used in other embodiments as well.

I claim:

1. A method of automatically interpreting well log data indicative of physical attributes of a portion of a subterranean formation comprising:
    obtaining training data comprising well logs including facies classification information for at least a portion of the well logs;
    dividing the training data into two subsets, a training set and a cross-validation set;
    using an automated supervised learning facies identification method to determine a preliminary identification of facies in the subterranean formation based on the training set;
    calculating a confusion matrix for the supervised learning facies identification method by comparing predicted and observed facies for the cross-validation set;
    calculating a facies transition matrix characterizing changes between contiguous facies;
    using the preliminary identification, the facies transition matrix, and the confusion matrix, to iteratively calculate updated facies identifications, wherein the facies identifications are used for selection of a location for drilling in the subterranean formation for hydrocarbon resources.

2. A method as in claim 1, comprising repeating the iteratively calculating, each time using a differing random seed for a random path to create a plurality of realizations of the updated facies identifications.

3. A method as in claim 2, wherein the plurality of realizations are used to generate a transition probability for each of a plurality of nodes.

4. A method as in claim 3, further comprising, creating a reservoir probability volume for the subterranean formation.

5. A method as in claim 2, wherein the plurality of realizations are used to generate a probability for a facies classification for each of a plurality of facies.

6. A method as in claim 1, wherein the iteratively calculating comprises applying the confusion matrix for each of a plurality of nodes for which $P_{ij} < T_{ij}$, where $P_{ij}$ is the predicted matrix and $T_{ij}$ is target transition matrix.

7. A method as in claim 6, wherein the applying is first performed for $T_{ij}$ for which i=j, then $P_{ij}$ is updated before the applying is performed for $T_{ij}$ for which i≠j.

8. A method as in claim 6, wherein the target transition matrix is defined as $T_{ij}=P_{ij}^{(1-w)}O_{ij}^{w}$ where $O_{ij}$ is an observed matrix, and $w=|(P_{ij}-O_{ij}P_{ij}+O_{ij})|^{\alpha}$, wherein α is a user defined constraint.

9. A system for automatically interpreting well log data indicative of physical attributes of a portion of a subterranean formation, the well log data comprising well logs including facies classification information for at least a portion of the well logs and being divided into two subsets, a training set and a cross-validation set, the system comprising: one or more processors configured to execute computer program modules, the computer program modules comprising:
  an automated supervised learning facies identification module configured to perform an automated supervised learning method to determine a preliminary identification of facies in the subterranean formation based on the calibration set;
  a confusion matrix calculating module configured to calculate a confusion matrix for the supervised learning facies identification method by comparing predicted and observed facies for the cross-validation set;
  a facies transition matrix module configured to calculate a facies transition matrix characterizing changes between contiguous facies; and
  an updated identification calculating module configured to use the preliminary identification, the facies transition matrix, and the confusion matrix, to iteratively calculate updated facies identifications, wherein the facies identifications are used for selection of a location for drilling in the subterranean formation for hydrocarbon resources.

10. A non-transitory, tangible medium encoded with machine executable instructions for performing a method of automatically interpreting well log data indicative of physical attributes of a portion of a subterranean formation, the well log data comprising well logs including facies classification information for at least a portion of the well logs and being divided into two subsets, a training set and a cross-validation set, the method comprising:
  performing an automated supervised learning method to determine a preliminary identification of facies in the subterranean formation based on the training set;
  calculating a confusion matrix for the supervised learning facies identification method by comparing predicted and observed facies for the cross-validation set;
  calculating a facies transition matrix characterizing changes between contiguous facies; and
  using the preliminary identification, the facies transition matrix, and the confusion matrix, to iteratively calculate updated facies identifications, wherein the facies identifications are used for selection of a location for drilling in the subterranean formation for hydrocarbon resources.

* * * * *